March 11, 1952    H. T. HODGES    2,588,980
NORMALIZING DEVICE FOR GEAR TRAIN SHUTTER RETARDS
Filed April 22, 1950    2 SHEETS—SHEET 1
FIG. 1.
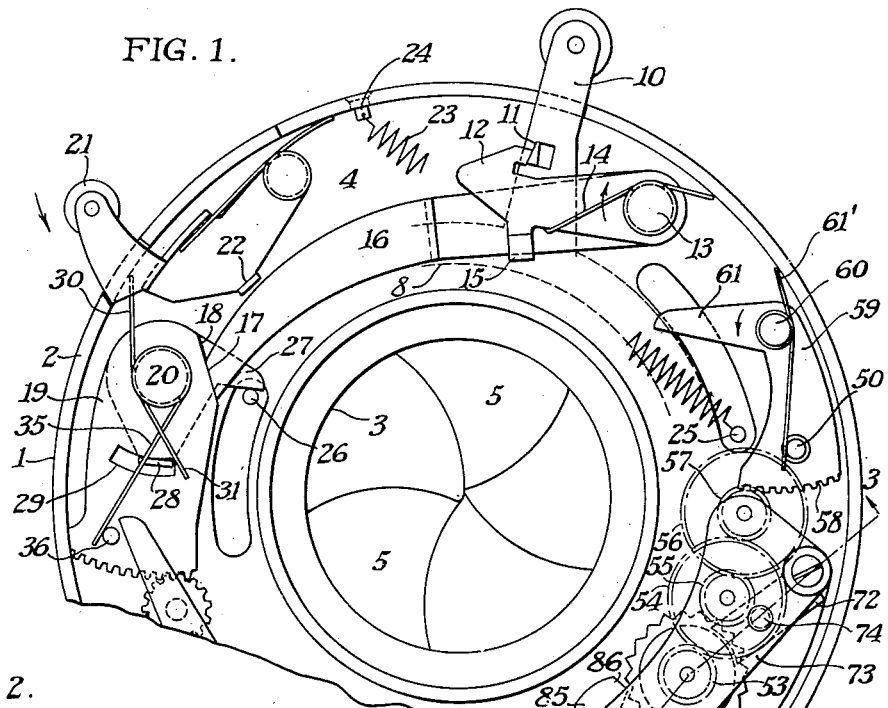
FIG. 3.
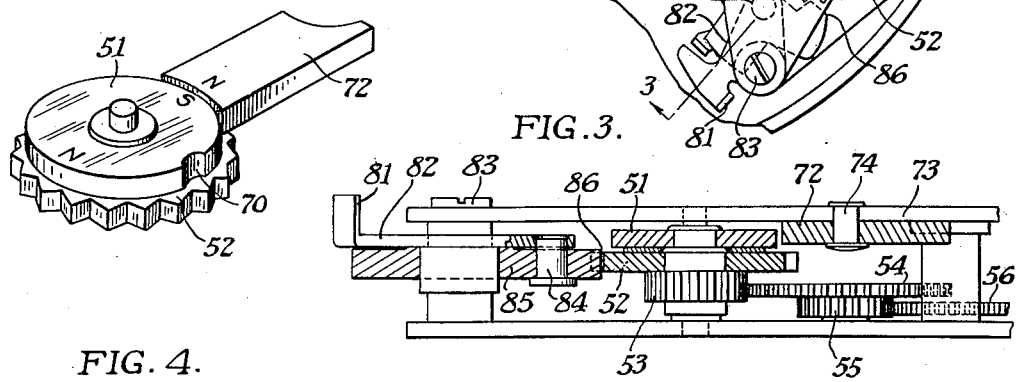
FIG. 2.
FIG. 4.
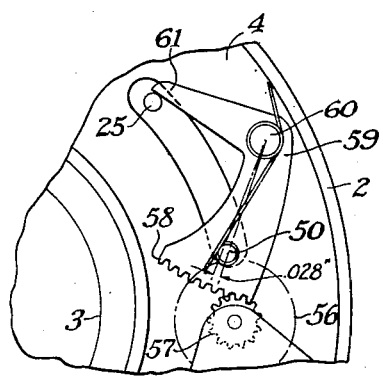
HOWARD T. HODGES
*INVENTOR*
BY Daniel J. Mayne
 Donald H. Stewart
*ATTORNEYS*

| A | B | | C |
|---|---|---|---|
| SHUTTER SPEED | TRAVEL OF SECTOR PIN | | STAR WHEEL TEETH TRAVEL |
| 1/800 | .000 | TRAIN OUT | 0 |
| 1/400 | .000 | " " | 0 |
| 1/200 | .028 | PALLET OUT | 14 |
| 1/100 | .044 | " | 22 |
| 1/50 | .058 | " | 29 |
| 1/25 | .140 | " | 70 |
| 1/10 | .018 | PALLET IN | 9 |
| 1/5 | .025 | " | 12.5 |
| 1/2 | .061 | " | 30.5 |
| 1 | .125 | " | 63 |

HOWARD T. HODGES
INVENTOR

BY *Daniel J. Mayne*
*Gerald H. Stewart*
ATTORNEYS

Patented Mar. 11, 1952

2,588,980

UNITED STATES PATENT OFFICE 2,588,980

NORMALIZING DEVICE FOR GEAR TRAIN SHUTTER RETARDS

Howard T. Hodges, Rochester, N. Y., assignor to Eastman Kodak Company, Rochester, N. Y., a corporation of New Jersey Application April 22, 1950, Serial No. 157,580

8 Claims. (Cl. 95—63)

This invention relates to photography and more particularly to a means for obtaining accurate retarding from a shutter employing a gear train retard. One object of my invention is to provide a shutter retard in which a weighted member will always have a predetermined position of rest. Another object of my invention is to provide a retard mechanism in which there is a means for overcoming the effects of play between teeth in gears of a gear retard. Still a further object of my invention is to provide a means by which the fastest moving part of the gear train, which is usually a weighted member, may be held in a fixed relation with respect to the slowest moving part of the gear train which is usually a gear segment. Still another object of my invention is to provide a gear retard with a means for holding the gear segment in an operative position and in contact with a speed-control cam, and to also provide the fastest moving part of the gear train with a means for holding it in a predetermined relation with respect to the gear segment. A still further object of my invention is to provide a magnetic device for materially increasing the efficiency of a gear retard mechanism for shutters. Other objects will appear from the following specification, the novel features being particularly pointed out in the claims at the end thereof.

The problem of obtaining accurate and consistent speeds upon successive operations of any shutter is a difficult one. Many shutters when successively tripped do not produce accurate speeds consistently, nor do they produce the same speeds consistently, whether accurate or not. The simplest type of shutter to time in assembling the shutter is one in which a simple weight can be held in a predetermined position by a spring from which position it may be moved by the shutter mechanism. Such retards, of course, are only employed for shutters having very few speeds. They are, however, frequently quite consistent. The more shutter speeds which are provided for, the more the difficulty in maintaining these speeds accurate and in timing the speeds to a reasonable tolerance. During the war, a war emergency standards for photographic shutters was set up. This provided the effective full-opening period of shutter blades should be within plus or minus 20% for 1/100th of a second or slower, and within plus or minus 30% for exposures faster than 1/100th of a second when the shutter is operating in temperatures of from 32° to 104° F. Thus, the difficulty of timing shutters is recognized by this standard which will probably be followed by American standards. The reason a simple weight is very effective as a retard for one, or perhaps two speeds is, of course, that the weight may always be held in the same position so that when the driving member comes along it will engage the weight under standardized conditions. With the more expensive shutters, a weight is still used as a part of a retarding mechanism, but in order to produce more retarding effects, usually two or more gears connect the weight with the gear segment which is the member against which the shutter-operating mechanism moves each time a retarded mechanism is set so that the gear segment may move the gears and the weight. In many shutters the weight may be in the form of a starwheel, but, in any event, the fastest moving part of the gear train is usually spaced from the gear segment by a number of gears. Unfortunately, perfect gears are not available at any price, so that a perfect gear train for shutters does not exist. In the better gear trains, of course, where the teeth are cut, there may be very little play between the teeth but very little play is sufficient to prevent repeated actuations of a shutter at one shutter speed setting at speeds which are consistent and close to the desired speed.

One of the difficulties with gear train retards is that when the shutter is set the gears are turned in one direction and the weighted member turns faster than the other gears and, consequently, the speed of setting a shutter may affect the gear train because if it is set slowly, the weighted member will probably rebound less than if the shutter is set quickly. In other words, the weight tends to turn after movement of the gear sector setting it is actually stopped and, therefore, if there is any play in the gears this play may lie in almost any direction according to the various forces involved. With such conditions, it is impossible to obtain speeds which are close to the rated speed and speeds which can be repeated at will without varying in a plus or minus direction from the rated speed.

I have largely overcome this difficulty by providing a gear train with a magnetic means for holding the weighted member in a preferred position of rest, particularly for a certain speed, or speeds. This preferred position is in some respects unimportant, so long as it is a consistent position, because the gear train will then always afford the same resistance under the same circumstances, particularly as the gear sector at the opposite end of the train is always held by its own spring against a timing cam so that it, too, will always be in a predetermined position for each exposure. As will be pointed out hereinafter, there are always certain speeds which are more difficult to time in assembling the shutter than other speeds; these speeds being the ones in which the gear sector moves the smallest amount. However, by "normalizing" the position of the weighted member, most of the difficulties which have heretofore occurred can readily be ironed out and unusual uniformity can be obtained.

Coming now to the drawings wherein like reference characters denote like parts throughout:

Fig. 1 is a fragmentary front view with parts broken away showing a known type of shutter equipped with a retard constructed in accordance with and embodying a preferred form of my invention;

Fig. 2 is a perspective view of the permanent magnet and polarized element as included in the retard shown in Fig. 1;

Fig. 3 is a fragmentary side elevation with parts being shown in section of the retard shown in Fig. 1;

Fig. 4 is a fragmentary, somewhat schematic, view showing the retard driving sector in a position in which it is moved only a very slight distance to retard a fast speed of a shutter a minimum amount. In this instance, the speed may be 1/200th of a second.

Figures 5, 6:
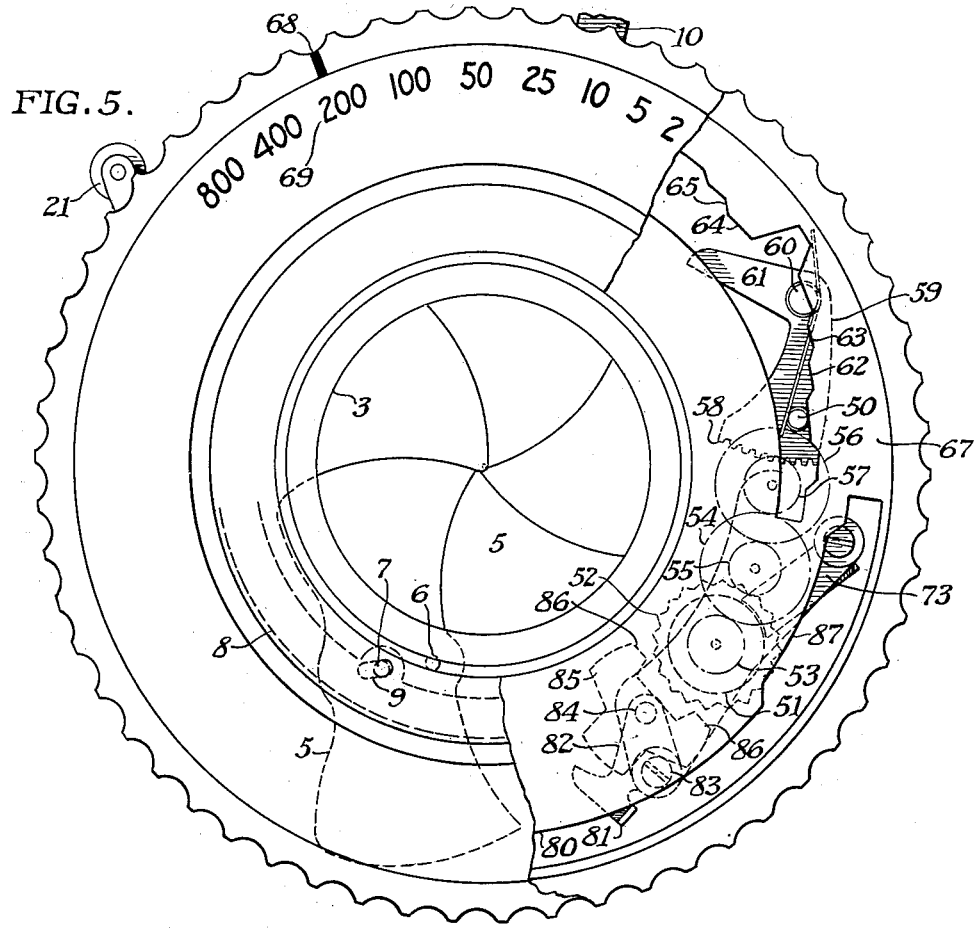
Fig. 5 is a fragmentary front view of a shutter showing the speed-adjusting cam and the cam for throwing out the pallet from the starwheel.
Fig. 6 is a chart of a typical high-grade shutter showing the various speeds operating without a gear train, the speeds operating with the gear train, but without the pallet, and the speeds operating with the gear train with the pallet in. This chart shows the travel in teeth of the starwheel for the various types of exposures.

As a typical example of a shutter which can be advantageously equipped with a gear train constructed in accordance with my invention, reference may be had to U. S. application Serial No. 728,528, Direct Acting Shutter for Cameras, filed February 14, 1947, by Carl C. Fuerst and resulting in U. S. Patent No. 2,524,786, granted October 10, 1950.

In the drawing of this case, Fig. 1 shows, somewhat schematically, the parts corresponding to the shutter in the above application consisting of a shutter casing 1 having an upstanding flange 2 around the periphery and a central exposure aperture 3. A mechanism plate 4 may support parts of the shutter blade driving mechanism; the shutter blades 5 being pivotally mounted at 6, Fig. 5, to the shutter casing and being movable about these pivots by pivot 7 extending upwardly from a blade ring 8 through slots 9 in the shutter blades. Thus, the blade ring 8 simultaneously moves all the shutter blades in one direction to make an exposure from the position shown in Fig. 1 wherein the shutter is shown as being set. In this set position, the blade ring 8 and its operating or setting handle 10 have been moved to a set position in which a latch element 11 may be held against movement by a latch element 12 pivotally mounted on a stud 13. This latch element is pressed in the direction shown by the arrow by means of a spring 14 until a lug 15 engages an edge of a release lever 16 also pivoted upon the stud 13.

This release lever has a cam end 17 which engages a driving cam 18 on a power-operated member 19. This member is mounted to turn upon a stud 20 when the shutter parts are in the set position shown, since the interengaging cams 17 and 18 are in substantial alignment between the pivotal points 13 and 20, the power-driven member 19 is held against movement. However, when a trigger 21 is moved in the direction shown by the arrow in Fig. 1, a lug 22 engages trip lever 16 and moves it a short distance toward the center of the shutter.

After such movement, the power-operated member takes over and continues to move the trip lever 16 until the latch 12 releases the latch element 11. A driving spring 23 attached to flange 2 at 24 and attached to the blade ring 8 at 25 will then drive the blade ring in a counterclockwise direction causing the shutter leaves 5 to open and close and thereby make an exposure. As indicated in the above-mentioned application, the trigger likewise operates a pair of cover blades to close the exposure aperture while the shutter is being set, but, since this forms no part of the present application, this structure need not be described herein.

In setting the shutter by the handle 10, the blade ring 8 moves a pin 26 so that it connects with one end 27 of a bell crank lever pivoted on the stud 20 and having a second arm 28 extending upwardly through an arcuate slot 29 in the power-driven member. There is a light spring 30 encircling the stud 20 having one end resting on the case and the other end lying directly beneath the arm of spring 31 lying against the lug 28. This spring tends to turn member 19 in the bell crank in a clockwise direction when lug 28 contacts with the end of slot 29. Thus, the function is that with the bell crank arm 27 held set as in Fig. 1, a spring 35 exerts a torque on a pin 36 which will overcome spring 30 as soon as cam 17 is moved a sufficient distance by trigger 21 to release cam 18, enabling the power-driven member 19 to continue the releasing movement of the latch element 16 until the shutter is released.

As thus far described, the shutter mechanism is the same as that shown in the above-mentioned Fuerst application. It is obvious that my invention may be applied to any form of shutter leaf operating mechanism where in a gear retard is used, and wherein the gear retard is moved across a path followed by a pin on the shutter operating mechanism which moves with the shutter leaves to retard the shutter leaf movement.

By closely studying the retarding action of a number of shutters, it has been determined that even with the most accurate gears which can be cut, all of the gear trains will have slight play between the teeth and, consequently, when the gear sector or gear driving member is positioned in a predetermined position, the fastest moving gear of the gear train may not be in a predetermined position, and this is also true of the intermediate gears. If this gear play can be satisfactorily taken up, improved results would occur. Hair springs have been tried for this purpose but the difficulty with such a spring is that within the limits of a shutter it is not practical to use such a spring on the fastest moving gear, particularly where such a gear may have to revolve three or four times because there is no room for the long spring which would be required. Such springs applied to intermediate gears have improved the operation of gear trains but they have not by any means corrected the difficulties with them.

Referring to the chart in Fig. 6, wherein is charted the various speeds of a typical high-grade shutter, column "A" shows the various shutter speeds from 1/500th of a second to one second. Column "B" shows the travel of the sector pin, this sector pin being pin 50 and being selected because it was comparatively simple to measure the movement of this pin. Column "C" designates the starwheel travel; this travel being measured by teeth on the starwheel. In the present instance, the gear train had a 20-tooth starwheel so that, as will be noticed from this chart, only the 200th of a second indicated in line "D", the 10th of a second and 5th of a second in lines "E" and "F," required less than a single revolution of this starwheel and its gear. Therefore, with this particular shutter the difficult speeds to time accurately are the 200th, the 10th, and 5th.

However, all the speeds can obviously be made more accurate if there is no play between the teeth of the gear retard or if all the play between the gear teeth lies in one direction. The shutter can be accurately timed and it will repeat these speeds. By "timing" I mean to include filing off or swedging out that portion of the timing cam which controls the particular speed in question. With the particular gear train measured it was found that with the sector travel of .001", the starwheel will move a distance of one-half a tooth. Therefore, if there is a one or two tooth movement due to lost motion, it is obvious that it is impossible to accurately time the shutter and to accurately repeat set speeds.

In order to overcome this difficulty I have applied a polarized member 51 to a starwheel 52 which is the fastest moving gear of the gear train. The starwheel carries a pinion 53 meshing with a gear 54. In the present gear train there are a series of gears. Gear 54 turns with a pinion 55 meshing with a gear 56. Gear 56 carries a pinion 57 meshing with the teeth 58 of the gear segment 59 which I have called a gear sector which turns upon its shaft 60 and which includes an arm 61 lying in the path of pin 25 movable with the master member 8. A spring 61' tends to turn the gear sector in the direction shown by the arrow and until the pin 50 contacts with a cam step 62, 63, 64, 65, or the like, carried by the ring 67 which is turned until a pointer 68 indicates on a scale 69 the setting of the shutter.

Ring 67 also carries a cam 80 contacting with a lug 81, on bell-crank lever 82, pivoted at 83 to the shutter. Lever 82 pivotally supports at 84 a pallet 85 having arms 86 to engage the teeth of starwheel 52. When cam 80, Fig. 5, engages bell-crank lever 82, the pallet lies out of contact with the starwheel 52, but when cam 87 engages bell crank 82, a spring (not shown) moves the pallet 85 into engagement with the starwheel 52.

The polarized member 51 is shown as having a north and south pole and I prefer to provide a small notch 70 in this member at right angles to the direction of polarization to assist in orienting this piece. A permanent magnet 72 is attached to an upper gear plate 73 as by a rivet 74 and adjacent the path of the polarized member, so that when the south pole of the polarized member 51 is offset at an angle from the polarized member 72, it will turn the starwheel 52 and with it the remaining gears of the gear train in order to take up or put in lost motion, according to the position of the parts.

As pointed out above, the most difficult speed to time is the 1/200th of a second, because in this speed, as indicated in Fig. 4, the driving pin 25 barely touches the arm 61 of the gear sector 59 and moves it only a very slight distance. This distance with the particular shutter measured being .028" as indicated.

Consequently, the retarding action of the gear train must be free from play in one direction so that as the assembler times the shutter it may be properly timed. With the particular gear train mentioned, the total travel of the sector pin may be .028", while the total travel of the starwheel in teeth may be 14 teeth. Thus, the sensitivity for a plus or minus 20% change in speed would be .005" or 2.5 tooth travel of the starwheel. With variation in the position of the gears it is obviously difficult or impossible to keep within a 20% change plus or minus. However, by orienting the polarized member 51 with respect to the magnet 72, when the gear train is set for 1/200th of a second, all of the play may be eliminated in the gear teeth and the travel of the gear sector 59 will always be opposed in exactly the same manner by all the gears and, consequently, accurate exposures can be obtained.

Such orientation of the gears of the gear train make it possible to produce uniform exposures throughout the entire range of exposures of the shutter, because with the pallet out it will be noticed from Fig. 6 that only the 200th of a second turns less than a single turn.

For each revolution of the starwheel 52 there is a plus and minus torque between the polarized member 51 and the permanent magnet 72. Nevertheless, this action is always the same so that for each total revolution it does not appear to affect the accuracy of the speed. Of course, with a speed such as a 25th of a second, in which 70 teeth of the starwheel turn past a given point, there is little or no difficulty in obtaining a perfectly accurate exposure.

When the pallet is put in, as shown by lines "E" and "F," the starwheel travel is 9 teeth or 12½ teeth for a tenth and a fifth of a second. Consequently, the orientation should also be such as to tend to turn the gears in one direction for these speeds. The assembler can readily take care of the orientation of the polarized member by watching the notch 70. If it should be accurately aligned with the axis of the permanent magnet 72, this orientation can be altered by lifting the gear sector 59 so that the gears of the segment 58 will disengage the pinion 70, enabling the gear train to be turned until the orientation of the polarized element 51 and the magnet 72 is offset, and reengaging the sector 59.

Curiously enough, I have found in assembling a large number of polarized elements and magnets to shutters that it is scarcely ever necessary to orient the polarized element and magnet. By merely dropping them into place and testing the speed of the shutter, it would appear that if improperly oriented the play in the gear teeth might not be either taken out or put in. However, if the orientation is improper, it would immediately show up when the shutter assembler tried to speed the shutter as by filing or peening the speed cams. If the shutter would not repeat the shutter speed for which it is adjusted within very close tolerances, the shutter assembler would then change the orientation of the polarized element 51 and the magnet 72 which, as above explained, can be simply accomplished.

It is obvious that where the relationship of all the gears of a gear train is definitely established for any definite speed setting of the shutter, the travel of the arm 61 will always be the same. I have accomplished this by turning the starwheel by the magnetic system above described and I have been able in practice to take discarded shutters having one or more exposures which could not be accurately timed and could not be adjusted to repeat a predetermined exposure and by applying my polarized element to the fastest moving gear of the train and the permanent magnet close to the path of said member, I have been able to satisfactorily time such shutters.

My device requires extremely little power because the gear train is moved each time the shutter is set and the spring 61 must move the pin 50 into engagement with the speed-setting cam. With this state of affairs, the polarized member and magnet are probably moving during the time the magnetic forces turn the starwheel to a position to orient all of the gears relative to the gear sector in a predetermined position. While I prefer to turn the gears of the gear train in a direction to take up all play between the teeth (which in a good gear train may be 1 to 3 teeth of the starwheel), I have, nevertheless, been able to obtain completely satisfactory results in putting in all of the play between the gear teeth, rather than taking it out. Thus, actually, the gear segment would start moving before the starwheel where play is put into the teeth, but, nevertheless, since the gear train elements are all in the same position for each speed setting, this does not affect constant and accurate operation of the shutter if the shutter has been timed for this type of control. All that is required is that all the gear train gears or elements are in an exact predetermined position for each setting before an exposure is made.

While I have shown a preferred embodiment of my invention applied to a camera shutter having a long range of exposures, it is obviously less difficult to obtain accurate speeds from shutters having a shorter range of exposure. However, the above embodiment illustrates a preferred and entirely satisfactory form of my invention. I consider as within the scope of my invention all such claims as may come within the scope of the appended claims.

Having thus described my invention, what I claim is new and desire to secure by Letters Patent of the United States is:

1. A normalizing device for camera shutters of the type including a shutter casing, an exposure aperture therein, shutter leaves pivotally mounted in the shutter and normally covering the exposure aperture, a power-driven master member operably connected to the shutter blades for moving the blades to open and close the exposure aperture, a latch for the master member, a latch-releasing mechanism including a trigger, a retard comprising a train of gears one of which is a contact sector adapted to be driven by the master member to control the speed of operation thereof, means to control the shutter speed by moving the contact sector relative to the master member, said retard normalizing device comprising a polarized member carried by a member of the gear train spaced from the contact sector and a permanent magnet adjacent thereto whereby said magnet may tend to maintain the gear train in a predetermined position of rest.

2. The normalizing device for camera shutter retards defined in claim 1 characterized in that the gear train is moved by a spring towards a rest position after exposure and in that the permanent magnet may influence movement of the polarized member during movement of the gear train under the influence of its spring towards its rest position, thereby orienting the gears of the gear train as they approach a rest position.

3. A normalizing device for camera shutters of the type including a shutter casing, an exposure aperture therein, shutter leaves pivotally moved in the shutter and normally covering the exposure aperture, a power-driven master member operably connected to the shutter blades for moving the blades to open and close the exposure aperture, a latch for the master member, a latch-releasing mechanism including a trigger, a retard comprising a train of gears one of which is a contact sector adapted to be driven by the master member to control the speed of operation thereof, means to control the shutter speed by moving the contact sector relative to the master member, said normalizing device comprising the gear train and means tending to maintain the contact gear and a starwheel in a predetermined relationship to each other, said means comprising a polarized member included with the starwheel and a permanent magnet adjacent the path of the polarized member to exert a force thereon tending to turn the starwheel to a predetermined position with respect to the contact gear.

4. A normalizing device for camera shutters of the type including a shutter casing, an exposure aperture therein, shutter leaves pivotally moved in the shutter and normally covering the exposure aperture, a power-driven master member operably connected to the shutter blades for moving the blades to open and close the exposure aperture, a latch for the master member, a latch-releasing mechanism including a trigger, a retard comprising a train of gears one of which is a contact sector adapted to be driven by the master member to control the speed of operation thereof, means to control the shutter speed by moving the contact sector relative to the master member, said normalizing device comprising the gear train and means for orienting a star-wheel at one end of the gear train with the orientation of the contact sector at the other end thereof, said orienting means comprising polarized material on the starwheel and a permanent magnet carried adjacent the periphery of the starwheel periphery and fixedly mounted on the shutter, and a spring normally turning the contact sector toward a normal position of rest.

5. A normalizing device for photographic shutters, retards for shutters of the type employing a shutter casing having an exposure aperture, a pivotally mounted shutter leaf mounted to move to and from an aperture-covering position, a master member operably connected to the shutter leaf, a trigger for engaging and releasing the master member, said retard comprising a gear train one element of which is positionable in the path of the master member to delay the operation thereof, said gear train including wheels adapted to turn on shafts at progressively greater speeds from one end to the other, a normalizing device comprising a piece of polarized material affixed to the fastest moving gear train wheel and extending at right angles to the shaft thereof, and a permanent magnet positioned adjacent to, but out of, alignment with the axis of the polarized material whereby said magnet may always tend to turn the wheels of the gear train to take up lost motion between the teeth of said gears enabling the gears of the train to immediately retard when one element thereof is struck by the master member.

6. A normalizing device for camera shutter gear retards for shutters of the type including a shutter casing having an exposure aperture therein, a trigger for releasing the shutter, shutter leaves for opening and closing the exposure aperture, mechanism for operating the shutter leaves to open and close the aperture and including a pin moving through a path when the leaves are moving, said gear train comprising a sector having an adjustably mounted arm and a train of gears, one moving faster than the other gears, means for positioning said arm to and from the path of movement of the pin for retarding movement of the arm, said normalizing device comprising two parts, a polarized member and a permanent magnet, one part mounted on the fastest moving gear of the gear train and the other part mounted on the shutter adjacent the path of the first-mentioned part, one part being oriented with respect to the other part to turn one part relative to the other part to orient the gears of the gear train relative to the sector thereof at a predetermined speed setting.

7. A normalizing device for camera shutter retards for shutters of the type including a shutter casing having an exposure aperture therein, blades pivotally mounted therein, shutter mechanism operably connected to the shutter blades for moving the blades to open and close the aperture, said mechanism including a trigger and a protuberance moving through a path, a speed setting dial, a gear retard having an arm movable by the speed setting dial to and from the path of the protuberance, said gear retard including a gear moving faster than the other gears and moving more than one revolution for all exposures except a fast exposure for which said fast gear moves less than one revolution, said normalizing device comprising a coacting magnet and a polarized member, one carried by the fast gear and the other by the shutter and oriented relatively to each other for turning the fast gear in one direction and into a position of rest when said shutter is set for a fast exposure during which said fast gear moves less than one revolution, whereby the coacting magnet and polarized member may retain a predetermined relationship between the fast gears of the gear train and the arm.

8. A shutter comprising, in combination, a shutter casing, an exposure aperture therein, shutter leaves pivotally mounted in the shutter and normally covering the exposure aperture, a power drive having a protuberance and operably connected to the shutter blades for moving the blades for opening and closing the exposure aperture, a latch on the power drive, a latch-releasing mechanism including a trigger, a retard comprising a gear train, one element of which is a contact sector adapted to lie in the path of the protuberance to be driven thereby to control the speed of operation thereof, means to set the shutter speed including moving the contact sector relative to the power drive, and a retard normalizing device comprising a polarized member supported by a member of the gear train spaced from the contact gear sector and a permanent magnet adjacent thereto whereby the magnet and polarized member may regulate the position of gears of the gear train relative to the contact sector.

HOWARD T. HODGES.

REFERENCES CITED

The following references are of record in the file of this patent:

UNITED STATES PATENTS

| Number | Name | Date |
| --- | --- | --- |
| 2,410,649 | Fuerst | Nov. 5, 1946 |
| 2,494,042 | Fuerst | Jan. 10, 1950 |